Patented Dec. 22, 1925.

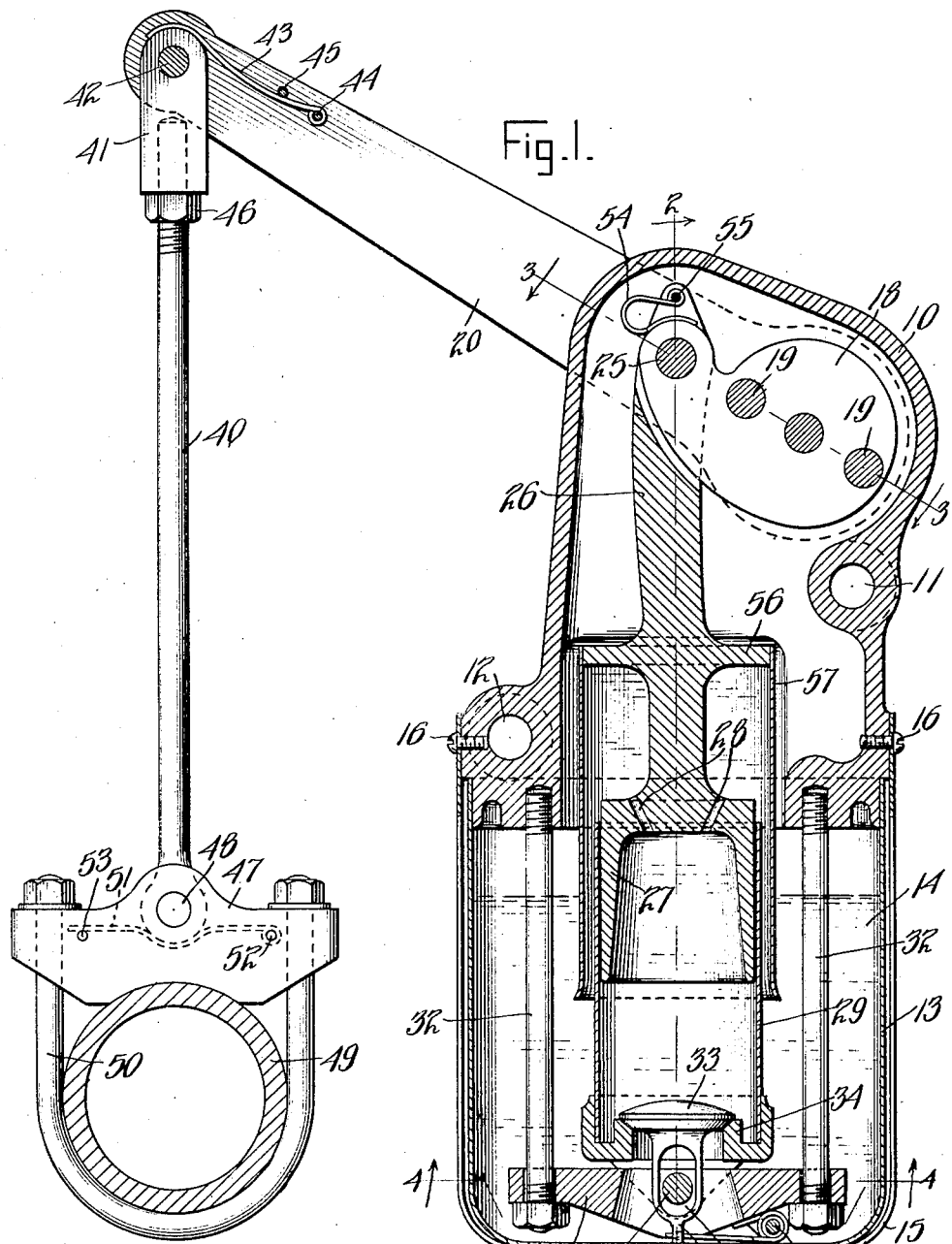

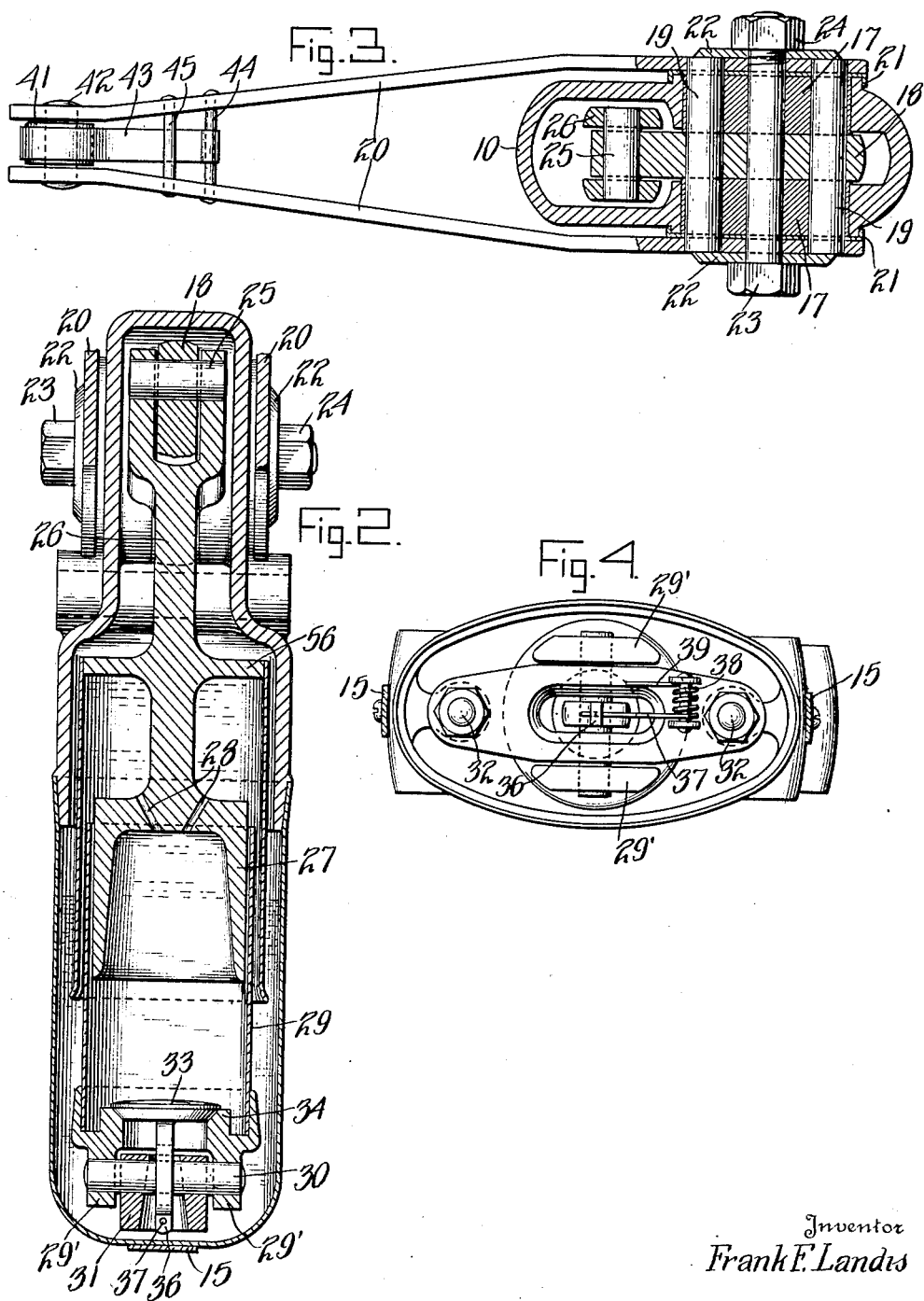

1,566,968

UNITED STATES PATENT OFFICE.

FRANK F. LANDIS, OF WAYNESBORO, PENNSYLVANIA.

SHOCK DIFFUSER.

Application filed January 31, 1925. Serial No. 6,108.

*To all whom it may concern:*

Be it known that I, FRANK F. LANDIS, a citizen of the United States, residing at Waynesboro, in the county of Franklin and State of Pennsylvania, have invented certain new and useful Improvements in Shock Diffusers, of which the following is a specification.

My said invention relates to a shock diffuser and it is an object thereof to provide a device of this character containing liquid which shall be protected against the action of the air so as to prevent foam or frothing due to the violent action of relatively moving parts on the liquid. This liquid is usually oil and the foam or froth is relatively permanent so that the casing soon becomes filled after which the oil froth works out of the casing through the various joints, which cannot be made tight enough to prevent some leakage of this character whereby the body of oil in the casing soon becomes dissipated so as to impair the work of the shock diffuser.

Another object of the invention is to provide improved means for preventing relative movement and consequent rattling of the connections between the shock diffuser and the vehicle.

Still another object is to provide improved means in connection with the cylinder for quickly closing the passage through which liquid flows into and out of the cylinder.

Referring to the accompanying drawings which are made a part hereof and on which similar reference characters indicate similar parts, Figure 1 is a side elevation of my device with parts in section to illustrate the internal construction, Figure 2, a section on line 2—2 of Figure 1, Figure 3, a section on line 3—3 of Figure 1, and Figure 4, a section on line 4—4 of Figure 1.

In the drawings reference character 10 indicates a housing provided with bolt holes at 11 and 12 for attachment to the body of a vehicle. This housing is intended to be rigidly fixed to the vehicle body and is made of relatively heavy and rigid material such as a brass or bronze casting. At the lower end of the housing an oil container 13 is supported, this oil container at its upper end fitting tight about a depending flange on the housing 10, and the whole forming a substantially air-tight casing inclosing the various movable parts and a body of oil or other suitable liquid indicated at 14. A bail 15 is supported on pivots 16 for lateral swinging movement and this bail when in the position indicated supports the oil container in the position shown. When the container is to be removed for any purpose the bail is swung to one side and the container may then be pulled off the flange on the housing.

At the upper end of the housing a pair of journals 17, here shown as having the form of disks, are supported for rocking movement in stationary bearings at opposite sides of the housing 10. A rockarm 18 is positioned between the journals 17 and is held in place by means of dowel pins 19 extending through the rockarm and journals. The dowel pins 19 also extend through an outer pair of rockarms 20 of greater length than arm 18. Between the rockarms 20 and the journals 19 I provide grit fenders 21 which have laterally directed annular flanges at their outer edges extending inward over annular shoulders on the housing 10 and which grit fenders serve for exclusion of dust from the housing. Externally of the rockarms 20 are a pair of washers 22 which are large enough to reach over the ends of the dowel pins 19 to hold them in place relatively to the various parts through which they extend. The washers 22 have central apertures in line with apertures in the intermediate members to receive a bolt 23 having a nut 24 which is screwed down tight to hold the parts rigidly together. It will be seen from the foregoing that the journals 17 can rock freely in their fixed supports, the washers 21 rocking with them and the remaining parts being free from frictional contact with any stationary part.

A pin 25 is carried by the rockarm 18 at its outer end, the ends of the pin extending into forks on a connecting rod 26 and providing in effect a crank-pin on rockarm 18. The connecting rod is here shown as integral with a piston 27 extending below the level of the liquid in the casing at its lower end, the piston being preferably in the form of a hollow cylinder or bell-shaped with the lower end open and the upper end closed except for a pair of ports 28. A cylinder 29 is supported on a pivot 30 carried by a yoke 31 supported at opposite ends by bolts 32 secured at their upper ends to the housing by any convenient means or integral with the housing if preferred. In the present case the bolts are threaded and screwed into threaded apertures in the housing. The cylinder 29 has a fluid passage at its lower end normally closed by a valve 33 having a beveled lower face fitting on a beveled seat formed on an upwardly projecting annular flange 34 on the cylinder head. The valve has an elongated aperture at 35 providing a sort of yoke straddling the pivot 30 to permit limited movement of the valve. At its lower end the valve has a depending lug 36 which is apertured to receive the long arm 37 of a coiled spring 38 having a short arm 39 bearing against the under face of the yoke 31. It will be seen that this spring normally holds the valve down to close the port at the lower end of the cylinder, at the end of all automobile spring compression movements. Said valve is always closed by said means before the start of spring recoil, thus preventing any possibility of partial recoil of the automobile spring before said valve is closed. Such partial recoil would cause a slight jar at the time of closing the valve if the action of gravity alone were to be relied upon for closing the valve.

The rockarms 20 at their outer ends are pivotally connected to a rod 40 through the agency of a cap 41 having an opening registering with openings in the rockarms to receive a pivot pin 42. A spring 43 is bent at one end to embrace a pivot pin 44 and at the other end is curved to rest on the rounded upper end of the cap 41. A pin 45 extends through the rockarms 20 over the spring in a position to bend the spring so as to hold the cap down against the upper surface of the pin 42. The rod 40 has threaded connection with the yoke 41 and a lock nut 46 on the rod holds the cap in adjusted relation.

At its lower end the rod 40 is pivotally connected to a yoke 47 by means of a pin 48. The yoke 47 extends across the axle 49 of the vehicle or any other suitable unsprung part of the vehicle and is firmly secured thereto by means of a U-bolt 50. To prevent lost motion between the parts 47 and 48 I have provided a spring 51 pivotally secured at one end to the yoke 47 by means of a pin 52 said spring having a bent portion bearing against the rounded lower end of the rod 40 and being supported at its free end by a pin 53 on the yoke 47. The action of the spring is such as to hold the upper surface of the pin 48 rigidly in contact with the adjacent faces of the yoke 47.

For preventing lost motion between the connecting rod 26 and the crank pin 25 I provide a bent spring at 54 having a part embracing a pin 55 extending through the upwardly projecting ends of the connecting rod. The spring is bent substantially into U-shape and has its free end bent into shape to rest on and contact closely with the rounded adjacent part of the rockarm 18. The intermediate part of the crank-pin 25 has a pressed fit in the outer end of crank 18 and the projecting ends of the crank-pin have a working fit in the bearings of the forks of the connecting rod 26. Due to the spring 54 the projecting ends of crank pin 25 are always in contact with the bearings in part 26, the spring forcing the parts in the direction they are moved during automobile spring recoil, thus preventing lost motion between the piston 27 and the arms 20 and also preventing a rattling noise due to such lost motion.

The liquid level in the casing is such as to rise above the lower rim of the piston 27 and in order to prevent access of the air to the interior of the piston I provide on the connecting rod 26 a radial flange 56 at some distance above the piston sufficient to clear the top end of cylinder 29. This radial flange supports an air-tight skirt 57 concentric with the piston and the cylinder 29 said skirt obviously being also liquid tight. This skirt is long enough so that its lower margin extends below the level of the body of liquid 14 at all times.

In the operation of my device, the housing being secured to the body or frame of the vehicle and the rod 40 being connected to the axle or other unsprung part the piston and cylinder will be forced one away from the other on the occurrence of a road shock. The large valve 33 is raised by the action of the incoming fluid preventing vacuum in the cylinder. The chamber in skirt 57 is also kept full by inflow of liquid between the skirt and the cylinder. Some slight flow may take place through ports 28 and through the space between the piston and the cylinder. Preferably, however, the piston fits so tight in the cylinder that the amount of fluid passing between these parts is reduced to a minimum. As soon as the action of the roadshock is finished causing spring compression the spring 38 will immediately pull the valve 33 down on its seat to prevent the slight jar which would otherwise occur at the beginning of the spring recoil before the action of the liquid itself could close the valve. On recoil of the spring the movement of the piston and the cylinder will be toward each other whereupon there may be a slight escape of fluid between the cylinder and the piston but the main operation or resistance to violent spring recoil will be by way of ports 28 where a violent flow of liquid occurs from the cylinder through the piston into the chamber in skirt 57. This chamber is always full of oil therefore no foaming occurs, the oil flowing out between the cylinder 29 and the skirt 57, but this outflow is comparatively slow and mild so that there is no agitation of the top surface of the main body of oil, therefore eliminating all foaming.

The various springs at 54, 43 and 51 all tend to force the parts into the relative positions naturally assumed during spring recoil. These springs act to prevent rattling which is otherwise bound to occur especially after the parts have become somewhat worn.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. In a shock diffuser, a casing, a body of liquid therein, an upwardly-opening cylinder therein, a fluid passage at the bottom of the cylinder, and means to prevent access of air to the cylinder, substantially as set forth.

2. In a shock diffuser, a container for liquid, an upwardly-opening cylinder therein, a piston in the cylinder, and means for moving the cylinder and piston relatively to each other while keeping the cylinder free from air, substantially as set forth.

3. In a shock diffuser, a container for liquid supported on the frame of a vehicle, an upwardly-opening cylinder therein, a piston in the cylinder, and means connected to an unsprung part of the vehicle for moving the cylinder and piston relatively to each other while keeping the cylinder free from air, substantially as set forth.

4. In a hydraulic shock diffuser, a reciprocating piston, a chamber without and integral with said piston said chamber being closed at its upper end, and an oscillating cylinder for said piston open at its under end said chamber surrounding said cylinder, substantially as set forth.

5. In a hydraulic shock diffuser, an oscillating cylinder open at the upper end, an inlet passage through the lower end, an intake valve for said passage, a reciprocating piston within said cylinder, and a skirt surrounding said cylinder and movable therewith said skirt closed at its upper end said cylinder and skirt being integral with a connection to an oscillating crank, substantially as set forth.

6. In a hydraulic shock diffuser, a housing having opposed bearings thereon, the combination of a rockarm, a pair of disk journals in said bearings clamped to opposite sides of the rockarm outside said journals, grit fenders engaging over the ends of the journals and adjacent parts of the housing, operating levers on the outer ends of said journals, and dowels extending through said rockarm, journals, fenders and operating levers, substantially as set forth.

7. In a hydraulic shock diffuser, the combination of a reciprocating piston within an oscillating cylinder, and a chamber reciprocating with the piston and surrounding the cylinder the open lower end of said chamber being submerged in a body of liquid, substantially as set forth.

8. In a shock diffuser, a pivoted cylinder, a piston reciprocating therein, and a skirt moving with the piston said skirt enclosing the open end of said cylinder, substantially as set forth.

9. In a shock diffuser, a casing, a cylinder open at its upper end, a piston reciprocating in said cylinder, a skirt rigid with said piston surrounding said cylinder, and a body of liquid in the casing submerging the lower end of the skirt, substantially as set forth.

10. In a shock diffuser, a casing, a cylinder open at its upper end, a piston reciprocating in said cylinder, an air-tight skirt rigid with said piston surrounding said cylinder, a body of liquid in the casing submerging the lower end of the skirt, and passages through the piston to the chamber within said skirt, substantially as set forth.

11. In a shock diffuser, a casing, a cylinder open at its upper end, a passage through the lower end of the cylinder a valve in the passage, a spring to close the valve, a piston reciprocating in said cylinder, a skirt on said piston surrounding said cylinder, and a body of liquid in the casing submerging the lower end of the skirt, substantially as set forth.

12. In a shock diffuser, a rigid housing, a fluid container suspended therefrom, a yoke also suspended from said housing, a pivot pin on the yoke, a cylinder pivoted on said pin, a passage at the bottom of the cylinder, a valve for said passage guided on the pivot pin, and a piston in said cylinder, substantially as set forth.

13. In a shock diffuser, a rigid housing, a fluid container suspended therefrom, a yoke also suspended from said housing, a pivot pin on the yoke, a cylinder pivoted on said pin, a passage at the bottom of the cylinder, a valve for said passage guided on the pivot pin, a piston in said cylinder, and a spring normally closing said valve, substantially as set forth.

14. In a shock diffuser, an oscillating crank, a piston rod supported thereby, a piston rigid with said rod, a skirt on the rod surrounding the piston, a cylinder receiving the piston and having its upper margin within said skirt, a body of liquid submerging the lower edge of the skirt, and passages leading from said body into said cylinder through said piston into said skirt and from said skirt to said body of liquid respectively, substantially as set forth.

15. In a shock diffuser, a pair of oppositely movable shock diffusing elements, and anti-rattling connections from said elements respectively to the vehicle body and to an unsprung part of the vehicle including a pair of pivotally connected parts and a leaf spring on one of said parts bearing against and flexed out of normal shape by a surface on the other part, substantially as set forth.

16. In a hydraulic shock diffuser, an oscollatory cylinder, a reciprocatory piston within an oscillatory cylinder, a connection between said piston and an oscillatory crank, in combination with an inverted reciprocatory cylinder surrounding said oscillatory cylinder providing a free annular passage around said oscillatory cylinder and within said reciprocatory cylinder said passage terminating beneath the top surface of a body of liquid, substantially as set forth.

In witness whereof, I have hereunto set my hand and seal at Waynesboro, Pennsylvania, this 23d day of January, A. D. nineteen hundred and twenty-five.

FRANK F. LANDIS. [L. S.]